Oct. 26, 1926.
J. M. MEREDITH ET AL
1,604,185
TIRE AND WHEEL CONSTRUCTION
Filed April 3, 1925
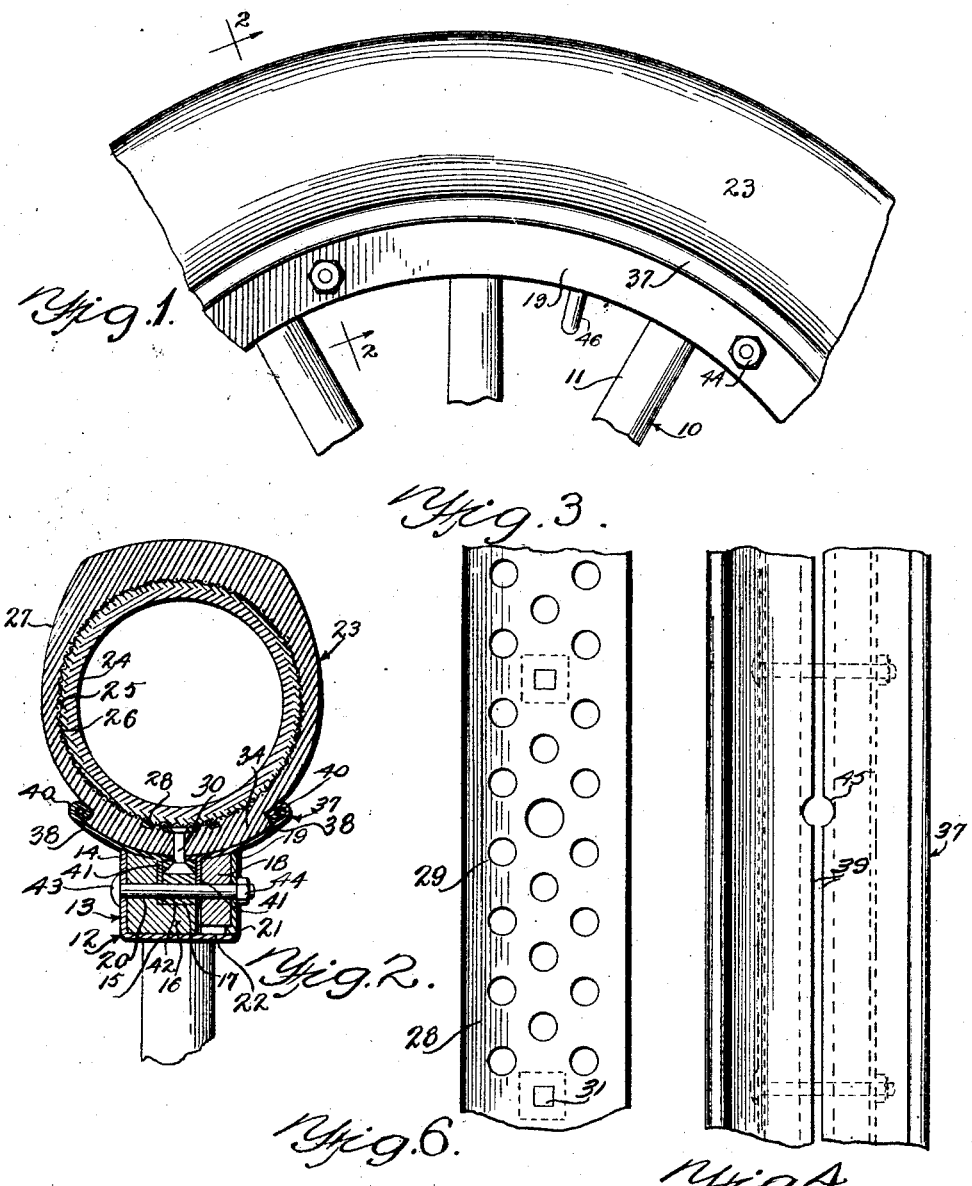
Inventor
Jaquelin M. Meredith
Temple A. Nuckols
By 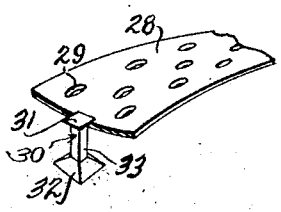
Attorney Patented Oct. 26, 1926.

1,604,185

UNITED STATES PATENT OFFICE.

JAQUELIN M. MEREDITH AND TEMPLE A. NUCKOLS, OF NORFOLK, VIRGINIA.

TIRE AND WHEEL CONSTRUCTION.

Application filed April 3, 1925. Serial No. 20,512.

This invention relates to improvements in tires and wheels for motor vehicles and more particularly to a combined construction including a novel form of tire, wheel felly and rim.

An important object of the invention is to provide a longitudinally split rim, the sections of which are adapted to be separated laterally to permit removal of the tire.

A further object is to provide a device of the above mentioned character wherein the tire is provided with inwardly projecting members adapted to be engaged by the wheel rim.

A still further object is to provide a puncture proof tire adapted to be mounted on a rim of the above mentioned character, the tire being provided with an inwardly projecting radial flange adapted to be received between sections of a wheel felly, the inwardly projecting flange of the tire being provided with embedded metallic elements which are adapted to be clamped by the inner edges of the split rim.

A still further object is to provide a wheel felly which is split longitudinally and is provided with a peripheral channel adapted to receive the inwardly extending flange of the tire, one section of the felly being removable to permit the tire and the rim to be withdrawn from the wheel.

Other objects and advantages of the invention will become apparent during the course of the following description.

In the drawings, we have shown one embodiment of the invention. In this showing:

Figure 1 is a fragmentary side elevation of a wheel constructed in accordance with the invention, Figure 2 is a section on line 2—2 of Figure 1, Figure 3 is a fragmentary face view of the anchoring band, Figure 4 is a similar view of a portion of the rim, Figure 5 is a fragmentary perspective view of a portion of the anchoring band, and, Figure 6 is a fragmentary transverse sectional view of a portion of the tire.

Referring to the drawings, the numeral 10 designates a wheel of any desired construction, shown in the present instance as being of the artillery type with spokes 11 of the usual construction. The wheel is provided with a felly indicated as a whole by the numeral 12. The felly includes a metallic supporting band 13 which is preferably L-shaped in cross section and includes a side section 14 and a base 15 which extends throughout the width of the felly. The band 13 is provided with a felly section 16 arranged therein and provided with a peripheral channel 17. The felly is further provided with a removable section 18, the inner wall of which forms one side wall of the channel 17, as shown in Fig. 2. The removable section 18 of the felly is provided with a metallic side band 19 secured thereto in any suitable manner. The felly sections and the metal bands associated therewith are provided with a series of aligned transverse openings 20 to receive securing elements to be described. The base 15 of the supporting band is provided adjacent its free edge with a lug 21 normally arranged within a transverse slot 22 extending entirely across the inner face of the felly section 18.

Referring to Figures 1, 2 and 6 the numeral 23 designates as a whole an improved tire construction adapted to be used in connection with the felly just described. The tire 23 comprises an inner layer 24 formed of plastic or self vulcanizing rubber which in turn is surrounded by a thin layer 25 of elastic vulcanized rubber. A layer of fabric 26 surrounds the rubber layer 25 as shown and this in turn is surrounded by the main tire casing 27. The rubber layer 25, fabric layer 26 and tire casing 27 are preferably vulcanized together in the finished tire. The casing 27 is formed generally according to the present practice in that it is preferably formed of a fabric carcass having a heavy layer of tread rubber thereon.

In the manufacture of the tire an anchoring band 28 is arranged parallel to the inside of the tire between the fabric band 26 and the main casing 27. The band 28 is preferably formed of thin metal and is perforated throughout its length as at 29. At spaced points throughout its length the band 28 is provided with inwardly projecting studs 30 which are riveted as at 31 to the band. The studs 30 extend inwardly a substantial distance beyond the main tire casing and are provided at their inner ends with outwardly flared heads 32 and the sides of the studs are flattened as at 33. A liner 34 is vulcanized against the inner side of the tire casing as shown in Figures 2 and 6. The liner 34 is of a width substantially equal to the distance between the flanges or beads of the rim to be described. The liner 34 is provided throughout its length with an inwardly extending radial flange 35 preferably formed integral therewith. The liner 34 is preferably formed of rubber similar to that of the casing 27. The flange 35 is provided at opposite sides near the body of the liner with grooves 36 extending throughout the circumference of the flange. The studs 30 extend a material distance inwardly into the flange 35 as shown in Figure 2 and the opposite sides of the flared lower ends of the studs are preferably flush with the sides of the flange 35.

The numeral 37 designates as a whole a rim adapted to be employed in connection with the device. The rim comprises a pair of complementary sections 38 having their inner edges 39 normally spaced apart a distance equal to the thickness of the shanks of the studs as will become apparent. The rim sections may be provided at opposite sides with beads 40 adapted to engage the outer edges of the liner 34. Each rim section is provided at a point spaced from the inner ends thereof with an inwardly extending radial flange 41 and these flanges are normally spaced apart a distance equal to the thickness of the flange 35. It will be obvious that the flanges 41 are adapted to be arranged against the sides of the flange 35 and the latter, together with the flanges 41, is provided with transverse openings 42 corresponding in arrangement to the transverse openings 20. Bolts 43 are arranged in the respective transverse openings and each bolt is provided with the usual nut 44 threaded on one end. The inner edges of the rim sections are provided with opposite cut out portions 45 through which the inflating valve 46 of the tire is adapted to extend.

The operation of the device is as follows: The various elements of the tire are assembled in the manner described, each successive element being vulcanized to the next element, while the inner layer of rubber 24 is allowed to remain in a plastic or self healing condition. When the device is in position on the tire as shown in Figure 2, the inner edges 39 of the rim sections are adapted to engage the shanks of the studs 30 as shown in Figure 2 to properly space the rim sections. The bolts 43 are adapted to clamp the felly sections together against the outer faces of the rim flanges 41 whereby the tire may be secured in position with the edges 39 of the rim sections tightly clamped against the flat outer faces of the shanks of the studs. The self healing rubber within the tire is adapted to heal any punctures which occur during the operation of the device. If it is desired for any reason to remove the tire, the nuts 44 are removed and the bolts withdrawn, whereupon the felly section 18 may be withdrawn from the side of the wheel. This action permits the rim and tire to be withdrawn as a unit and the rim sections may be separated laterally from the tire as will be obvious. When the tire is to be replaced, the rim sections are arranged in normal position and the tire replaced with the openings 42 in alinement with the openings 20. The stud 21 and groove 22 are preferably so arranged that they will register when the transverse openings 20 in the felly sections are in alinement to permit the removable felly section 18 more easily to be placed on the wheel in proper position. The section 18 is turned so that the lug 21 and groove 22 register whereupon it is moved inwardly against the adjacent flange 41 and the bolts 43 are then applied in the usual way. The anchoring band 28 is provided with perforations 29 to permit the rubber of the casing to flow therethrough to become vulcanized with the fabric layer 26. The band 28 serves to securely anchor the studs 30 to prevent their displacement when in use.

It is to be understood that the form of our invention herewith shown and described is to be taken as a preferred example of the same and that various changes in the shape, size and arrangement of parts may be resorted to without departing from the spirit of the invention or the scope of the subjoined claims.

We claim:

1. A device of the character described comprising a tire having an inflatable casing, an inwardly projecting radial elastic flange carried by said tire, and a plurality of non-compressible elements embedded in said flange and having portions flush with the sides thereof.

2. A device of the character described comprising a tire, a band carried by said tire, an inwardly projecting elastic flange carried by said tire, and a plurality of non-compressible elements carried by said band and having portions embedded in said flange.

3. A device of the character described comprising a tire casing, a metallic band carried by said casing, an inwardly projecting elastic flange carried by said tire, and a plurality of metallic studs secured to said band and extending into said flange, said studs being provided in said flange with flattened portions arranged flush with the surfaces of said flange.

4. A device constructed in accordance with claim 3 wherein said band is continuous and embedded in said tire.

5. A device of the character described comprising a tire casing, a metallic band embedded therein, an inwardly projecting elastic flange carried by said tire, and a plurality of spaced metallic studs secured to said band and extending inwardly therefrom, said studs having shanks materially thinner than said flange and extending therethrough, said flange being provided on opposite sides near said tire with annular grooves extending to the sides of the shanks of said studs.

6. A device constructed in accordance with claim 5 wherein said studs are provided with laterally extending portions arranged flush with the sides of said elastic flange inwardly of said grooves.

In testimony whereof we affix our signatures.

JAQUELIN M. MEREDITH.
TEMPLE A. NUCKOLS.